(12) United States Patent
Henkle et al.

(10) Patent No.: US 10,924,909 B2
(45) Date of Patent: Feb. 16, 2021

(54) EDGE-BASED LOCATION-SPECIFIC WARNING SYSTEM FOR LTE NETWORKS

(71) Applicant: John Mezzalingua Associates, LLC, Liverpool, NY (US)

(72) Inventors: Patrick Henkle, Homer Glen, IL (US); Vishal Agrawal, Grayslake, IL (US); Jeffrey Courington, Chester, VA (US); Todd Landry, Grayslake, IL (US); Sasi Eswaravaka, Round Lake, IL (US); John Blasko, Grayslake, IL (US); Stephen Turner, Mechanicsville, VA (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

(21) Appl. No.: 16/629,837

(22) PCT Filed: Sep. 11, 2018

(86) PCT No.: PCT/US2018/050495
§ 371 (c)(1),
(2) Date: Jan. 9, 2020

(87) PCT Pub. No.: WO2019/055425
PCT Pub. Date: Mar. 21, 2019

(65) Prior Publication Data
US 2020/0382936 A1     Dec. 3, 2020

Related U.S. Application Data

(60) Provisional application No. 62/557,288, filed on Sep. 12, 2017.

(51) Int. Cl.
*H04W 4/90* (2018.01)
*H04W 92/04* (2009.01)
(Continued)

(52) U.S. Cl.
CPC ............ *H04W 4/90* (2018.02); *H04W 88/085* (2013.01); *H04W 88/184* (2013.01); *H04W 92/045* (2013.01)

(58) Field of Classification Search
CPC ......... H04W 4/90; H04W 4/02; H04W 92/24; H04W 76/50; H04W 4/021; H04W 4/185;
(Continued)

(56) References Cited

U.S. PATENT DOCUMENTS

2011/0230162 A1* 9/2011 Mutikainen et al. ...... 455/404.1
2012/0155324 A1* 6/2012 Janakiraman et al. ....... 370/254
(Continued)

FOREIGN PATENT DOCUMENTS

| WO | 2017099165 | 6/2017 |
|----|------------|--------|
| WO | 2017129742 | 8/2017 |
| WO | 2017151025 | 9/2017 |

*Primary Examiner* — Meless N Zewdu
(74) *Attorney, Agent, or Firm* — Dentons US LLP

(57) ABSTRACT

Disclosed is a mobile edge computing system that provides localized emergency responses and warning exclusively to UEs within a venue or area, and provides location-specific warning within the venue or area. The system includes a component that aggregates the S1-mme interface between the MME and a plurality of baseband units and provides read and write access to the S1-mme interface. The disclosed mobile edge computing system can issue cell-specific public warning system (PWS) messages that are customized for and transmitted exclusively to each individual cell within the venue.

13 Claims, 8 Drawing Sheets

(51) Int. Cl.
*H04W 88/18* (2009.01)
*H04W 88/08* (2009.01)

(58) Field of Classification Search
CPC ......... H04W 36/00; H04W 8/08; H04W 8/26; H04W 88/00; H04W 88/02; H04W 88/08; H04W 88/16; H04W 4/50; H04W 92/00; H04W 92/04; H04W 92/045; H04W 92/14; H04W 76/00; H04W 76/10; H04W 76/11; H04W 4/06; H04W 4/30; H04W 88/18; H04W 88/14; H04H 20/59; H04H 20/72; H04L 12/14; H04L 29/08; H04M 2242/00; H04M 2242/02; H04M 2242/04; H04M 2242/30
See application file for complete search history.

(56) References Cited

U.S. PATENT DOCUMENTS

| | | | |
|---|---|---|---|
| 2012/0155428 A1* | 6/2012 | Bovo et al. | 370/331 |
| 2013/0294403 A1* | 11/2013 | Srinivasan | H04W 36/165 |
| 2014/0003333 A1* | 1/2014 | Ivershen et al. | 370/328 |
| 2014/0011505 A1* | 1/2014 | Liao | H04W 4/005 |
| 2015/0215056 A1 | 7/2015 | Kozuka et al. | |
| 2015/0282120 A1* | 10/2015 | Liao | H04W 72/005 |
| 2016/0029179 A1* | 1/2016 | Kim et al. | H04W 4/06 |
| 2016/0249192 A1* | 8/2016 | Cai et al. | H04W 4/22 |
| 2017/0251345 A1 | 8/2017 | Gao et al. | |
| 2017/0272350 A1* | 9/2017 | Gao et al. | H04L 43/18 |
| 2019/0349426 A1* | 11/2019 | Smith et al. | H04L 67/1046 |

\* cited by examiner

EDGE-BASED LOCATION-SPECIFIC WARNING SYSTEM FOR LTE NETWORKS

This application is the National Stage filing under 35 U.S.C. 371 of International Application No. PCT/US2018/050495 filed on Sep. 11, 2018, which claims the benefit of U.S. Provisional Application No. 62/557,288 filed on Sep. 12, 2017, the contents of which are all hereby incorporated by reference herein in their entirety.

BACKGROUND OF THE INVENTION

Field of the Invention

The present invention relates to wireless communications, and more particularly, to an LTE mobile edge computing system that provides localized emergency responses and warning exclusively to UEs within a venue or area, and provides location-specific warning within the venue or area.

Related Art

LTE-based mobile networks enable many features to be executed by a mobile operator from within the Evolved Packet Core (EPC) network. The EPC interfaces with the Radio Access Network (RAN) which is how the mobile devices ultimately connect to the mobile operator networks.

The LTE base station, or eNodeB (eNB), is the main element of the RAN which generate the wireless signals and regulates access and connectivity of the mobile devices. Generally speaking the eNB is subservient to the elements within the EPC. Consequently, features, functions and capabilities implemented "above the RAN" are transparent to the eNB. However, due to the relatively close proximity of the eNB to mobile devices, and thus to the users of those devices, the eNB is ideally suited to perform certain enhanced functions, loosely referred to as "Mobile Edge Computing" (MEC), which can be beneficial to the mobile devices and users.

Mobile Edge Computing (MEC): MEC is a network architecture concept that enables cloud computing capabilities and an IT (information technology) service environment at the edge of the cellular network. The basic idea behind MEC is that by running applications and performing related processing tasks closer to the cellular customer, network congestion is reduced and applications perform better. MEC technology is designed to be implemented at the cellular base stations, and it enables flexible and rapid deployment of new applications and services for customers. Combining elements of information technology and telecommunications networking, MEC also allows cellular operators to open their radio access network (RAN) to authorized third-parties, such as application developers and content providers.

Beyond being a bourgeoning technical concept, there are few practical implementations or uniform methods for demonstrating a MEC application. In large part this is due to the complexity of implementing and deploying such a capability within an LTE RAN environment where subscriber and device security is paramount. Further, the macro cellular network, with its physical proximity of the eNB (such as a cell tower facility, or even a CRAN cluster coupled with the transient nature of mobile devices) is not conducive to many MEC applications. Consequently, noted MEC applications are focused on "offloading" IP traffic locally to a local area network using 3GPP-defined mechanism such as LIPA (Local IP Access) and Selective IP Traffic Offload (SIPTO) where traffic destined for a private network—such as that of a company—can be offloaded locally in places where a eNB (or small cell base station) is physically located near the destination LAN. However, these methods, while defined by 3GPP, are seldom used in practice because they require special service definitions and coordination with the mobile operator, including defining the capabilities on the Subscriber Identity Module (SIM) Card that is inserted in each mobile device. This level of administration and coordination make them impractical for the mobile operators. Further, there have been concerns expressed over potential conflicts with legal requirements for lawful inspection (wiretap) court orders.

Public Warning Service and Other Mass Notification Solutions: The National Public Warning Service, governed by FEMA, allows for mass notification of emergency warnings and instructions, simultaneously over multiple medias such as cable television, broadcast television, AM/FM radio and cellular networks. The latter being referred to as Wireless Emergency Alerts (WEA). Authorized parties can "interface" with the PWS through a gateway hosted by FEMA. Such authorized parties include FEMA, the FBI, state and certain municipal law enforcement agencies as well as NOAA in the case of emergent severe weather events.

The Public Warning System is ideal for issuing warnings and instructions for situations that are far reaching in terms of geography and potential persons affected. Typically, these messages cover many counties, municipal/government and law enforcement jurisdictions. Perhaps the most well known example of a type of "event" covered by the Public Warning System is an "Amber Alert", which was instituted in 1996 in order to quickly resolve suspected child abductions. There are detailed statistics and annual reports regarding the effectiveness of the Amber Alert laws. Although the Amber Alert has undoubtedly lead to improved recovery times for abducted children it is still subject to a large, and arguably necessary, bureaucratic process. The following are the standardized Amber alert criteria: (1) law enforcement must confirm that an abduction has taken place: (2) the child must be at risk of serious injury or death; (3) there must be sufficient descriptive information of the child, captor, or captor's vehicle to issue an alert; and (4) the child must be under 18 years of age.

All uses of the National Public Warning System have a necessary degree of oversight and scrutiny in order to ensure that the system is used as intended, and that it does not lead to public panic or overreaction as a result of misuse, whether intentional or accidental.

Other examples of use of the Public Warning System include the following: notification of a prison break of dangerous subjects: notice of a biological hazard such as a chemical spill; and notice of an imminent severe weather event, such as a tornado.

Interfacing to the Public Warning System to issue a warning message is based on authorized access to the FEMA system. Submitting a message requires the following inputs: (1) Federal Information Processing Standards (FIPS) codes (count) codes) representing the affected counties; (2) the warning message (following defined conventions); and various descriptors (emergency type, duration, severity, etc.).

Once submitted to FEMA, the messages are "forwarded" to the delivering parties, including the Mobile Operators based on the "Wireless Emergency Alert" (WEA) framework. The Mobile Operators ultimately forward the message to all of the eNBs serving the affected counties, which is typically dozens, covering hundreds of square miles. Finally, all cellular phones present in the designated counties will receive the message, even though many of those devices are many miles away from the incident.

Deficiencies in the Public Warning System include a relatively long lead time to message issuance; a broad disbursement area (county/counties); inability to provide any locally relevant information or instructions (lacking granularity); and limited controlled access, resulting in limited use.

Mass Notification Systems: There are several systems available for providing "mass notification" to groups of recipients using different media such as SMS text, voice calls, email and combinations of the above. These system can combine both predefined, prestored message and ad hoc messages. They are used for both on-demand circumstances and scheduled events. For example, an on-demand scenario would be a school district issuing a school closure message as a result of a snow storm; a scheduled event would be a school district issuing a reminder for a scheduled parent/teacher conference. These systems are based on pre-defined recipient list containing cell phone numbers and email addresses.

Deficiencies with mass notification systems are as follows: (1) they utilize static contact lists containing "opt-in" recipients; (2) they offer no location-related messaging capabilities, thus they cannot offer any messaging that has location context.

Accordingly, what is needed is mobile edge computing system that can issue cell-specific public warning system (PWS) messages that are customized for and transmitted exclusively to each individual cell within a specific location, such as a venue.

SUMMARY OF THE INVENTION

In an aspect of the present invention, a mobile edge computing system, comprises a plurality of baseband units, each coupled to a corresponding S1-mine interface; an aggregated S1-mme interface configured to be coupled to a Mobility Management Entity; and an S1-mine aggregator and access component coupled between the plurality of S1-mine interfaces and the aggregated S1-mme interface. The S1-mme aggregator and access component is configured to aggregate a plurality of uplink S1-mme signals, one from each of the baseband units, into an aggregated S1-mme signal for transmission over the aggregated S1-mme interface. The S1-mme aggregator and access component is further configured to terminate a downlink S1-mme signal from the aggregated S1-mme interface and split the downlink S1-mme signal into a plurality of individual downlink S1-mme signals and route each individual downlink S1-mine signal to its corresponding S1-mine interface, and it is also configured to provide access to the S1-mine uplink signals and to the S1-mine downlink signals. The mobile edge computing system further comprises a management and network operations component coupled to the S1-mme aggregator and access component. The management and network operations component configured to receive a warning instruction from a venue IT infrastructure wherein the warning instruction has a location information, and to generate a Write-Replace Warning Request message for transmission to one or more of the baseband units.

In another aspect of the present invention, a method for providing a local warning message in an LTE network comprises receiving a cell restart indication signal from one of a plurality of S1-mme interfaces, wherein each of the plurality of S1-mme interfaces corresponds to a baseband unit; retrieving cell information from the cell restart indication signal; storing the cell information; and aggregating the plurality of S1-mme S1-mme interfaces into an aggregated S10-mme interface, including the cell restart indication signal In yet another aspect of the present invention, a method for providing a local warning message in an LTE network comprises identifying a Write-Replace Warning Request signal in an S1-mme data stream from a Mobility Management Entity: retrieving message information from the Write-Replace Warning Request signal; storing the message information; and routing the Write-Replace Warning Request signal to a baseband unit corresponding to the message information In yet another aspect of the present invention, a method for providing a local warning message in an LTE network comprises receiving a warning message instruction from a venue IT infrastructure; retrieving a location information from the warning message instruction; generating a Write-Replace Warning Request corresponding to the warning message instruction (or warning instruction); and inserting the Write-Replace Warning Request into a destination S1-mme data stream corresponding to a destination cell, wherein the destination S1-mme data stream is one of a plurality of S1-mme data streams, each S1-mme data stream corresponding to at least one cell.

DESCRIPTION OF EXEMPLARY EMBODIMENTS

Disclosed is a Patron or Edge Warning System (hereinafter "Edge Warning System") that may be deployed within, or correspond to, a venue such as a stadium, airport, hospital, or university campus. The Edge Warning System takes capability that might otherwise be based in a mobile operator's core network, and deploys it in a Mobile Edge Computing domain, enabling currently unavailable operational capability. The enabled functionality may be encompassed within the Edge Warning System, which may be integrated within an LTE Radio Access Network (RAN), between one or more Mobility Management Entities (MME) and the RAN's Baseband Units (BBUs).

The Edge Warning System, and its subsystems and components, fall within the Mobile Edge Computing (MEC) domain, enabling Mobile Edge Computing functions while remaining compliant with existing LTE standards. In doing so, the Edge Warning System remains transparent to the established Evolved Packet Core (EPC) and RAN elements while ensuring interoperability with said elements.

The Edge Warning System enables authorized persons within a venue, typically representatives from its security office, to issue broadcast messages to selected cells serving the wireless subscribers connected to the venue's LTE cellular infrastructure. The Edge Warning System allows the venue to broadcast messages selectively to all cells, individual cells or combinations of cells, as circumstances dictate. This may be included as a pre-defined emergency response plan, or ad-hoc as an emergent event arises. Examples include warning messages and instructions for events such as severe weather affecting the venue, a missing child, a suspected abduction, a fire, a bomb threat, an active shooter incident, etc. The Edge Warning System enables rapid location-specific broadcasts to multiple mobile devices, belonging to different mobile operators, at once.

The Edge Warning System is a compliment to, and not a replacement for, the above-mentioned conventional Public Warning Systems. The Edge Warning System enables a smaller scale, localized ability to issue warning messages at an individual venue level where warning messages can be delivered exclusively to the cells, and consequently devices, within a venue, and with a location-specific distinct message to each individual cell within the venue. The system is also transparent to, and compatible with, existing National PWS mechanisms so that all messages issued through the National PWS will also be issued to the cells within the venue. The ability to communicate location-specific warning information to all devices within a given cell can be particularly powerful for sites with many dispersed cells over a fairly large area such as college campuses, as well as for visitors to those sites who are not familiar with the venue's facilities, exits, emergency procedures, etc.

Figure 1:
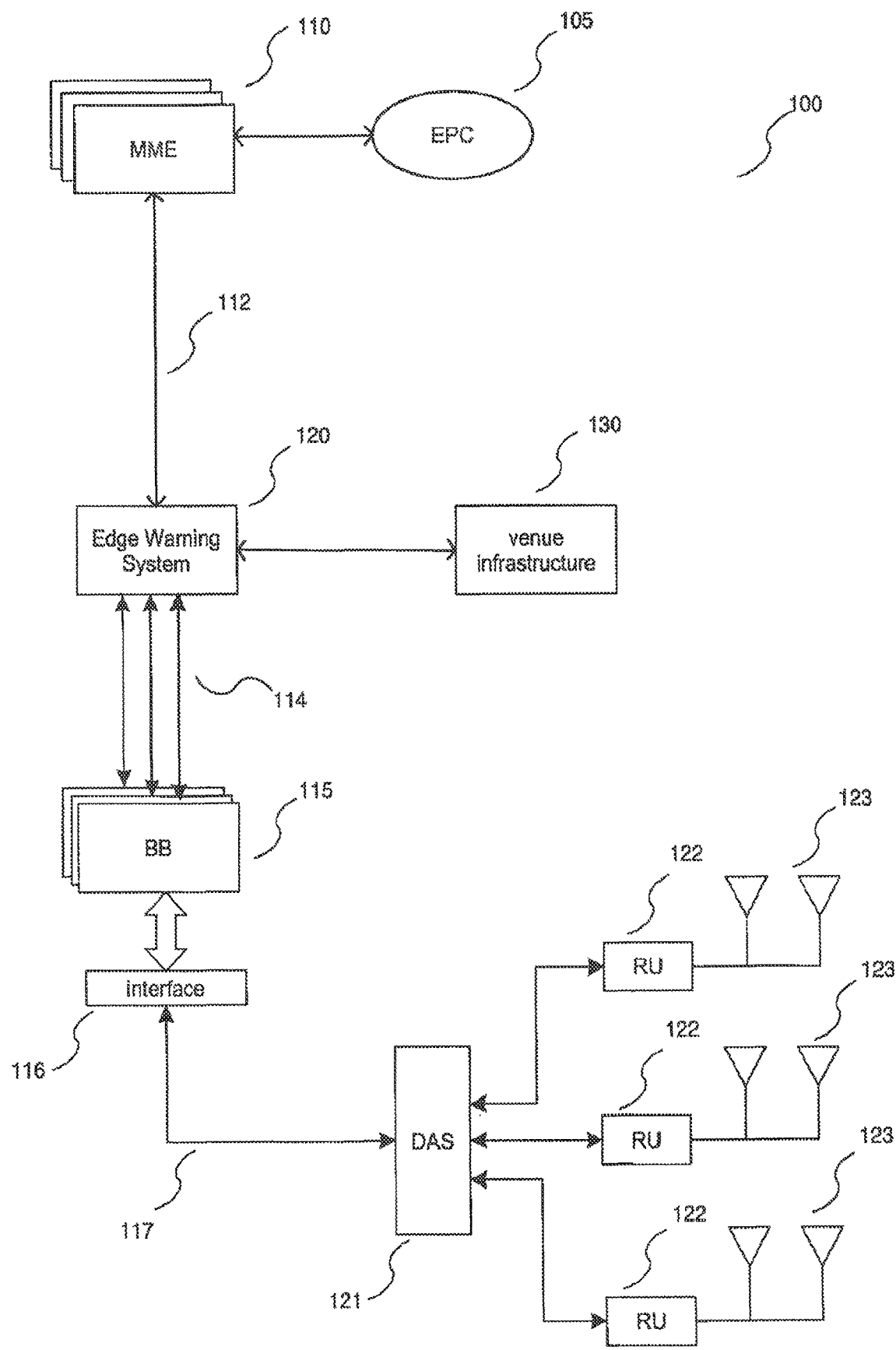
FIG. 1 illustrates and exemplary mobile edge computing system according to the disclosure.

FIG. 1 illustrates an exemplary LTE network edge system 10 according to the disclosure. System 100 includes an Evolved Packet Core (EPC) 105 and one or more Mobility Management Entities (MME) 110, each of which is coupled to an Edge Warning System 120 via an aggregated S1-mme interface 112. Both the MMEs 110 and the (aggregated) S1-mme interface may be standard LTE subsystems as defined under the appropriate 3GPP specifications.

The Edge Warning System 120 is coupled to a plurality of Baseband Units 115 via a plurality of corresponding S1-mme interfaces 114. Each S1-mme interface 114 may be identical in implementation to each other and to the aggregated S1-mine interface 112, and in accordance with the relevant 3GPP specification. Edge Warning System 120 is also coupled to a local venue IT infrastructure 130 via one or more Ethernet connections. The local venue IT infrastructure 130, described further below, may include one or more IT systems associated with a venue's security and business operations.

Each Baseband Unit 115 may be coupled to a Distributed Antenna System (DAS) 121 via interface 116 and fronthaul connection 117. Fronthaul connection 117 may be a standard digital radio communication link, such as defined by the Common Public Radio Interface (CPRI) or Open Base Station Architecture Initiative (OBSAI). DAS 121 may include one or more Remote Units 122, each of which are coupled to one or more antennas 123.

It will be apparent that variations to system 100 are possible and within the scope of the disclosure. For example, one or more additional DAS systems 121 may be present and coupled to the Baseband Units 115, or DAS 121 may be replaced by or supplemented with one or more small cell systems or a macro cellular system. It will be readily apparent that such variations are possible and within the scope of the disclosure.

Figure 2:
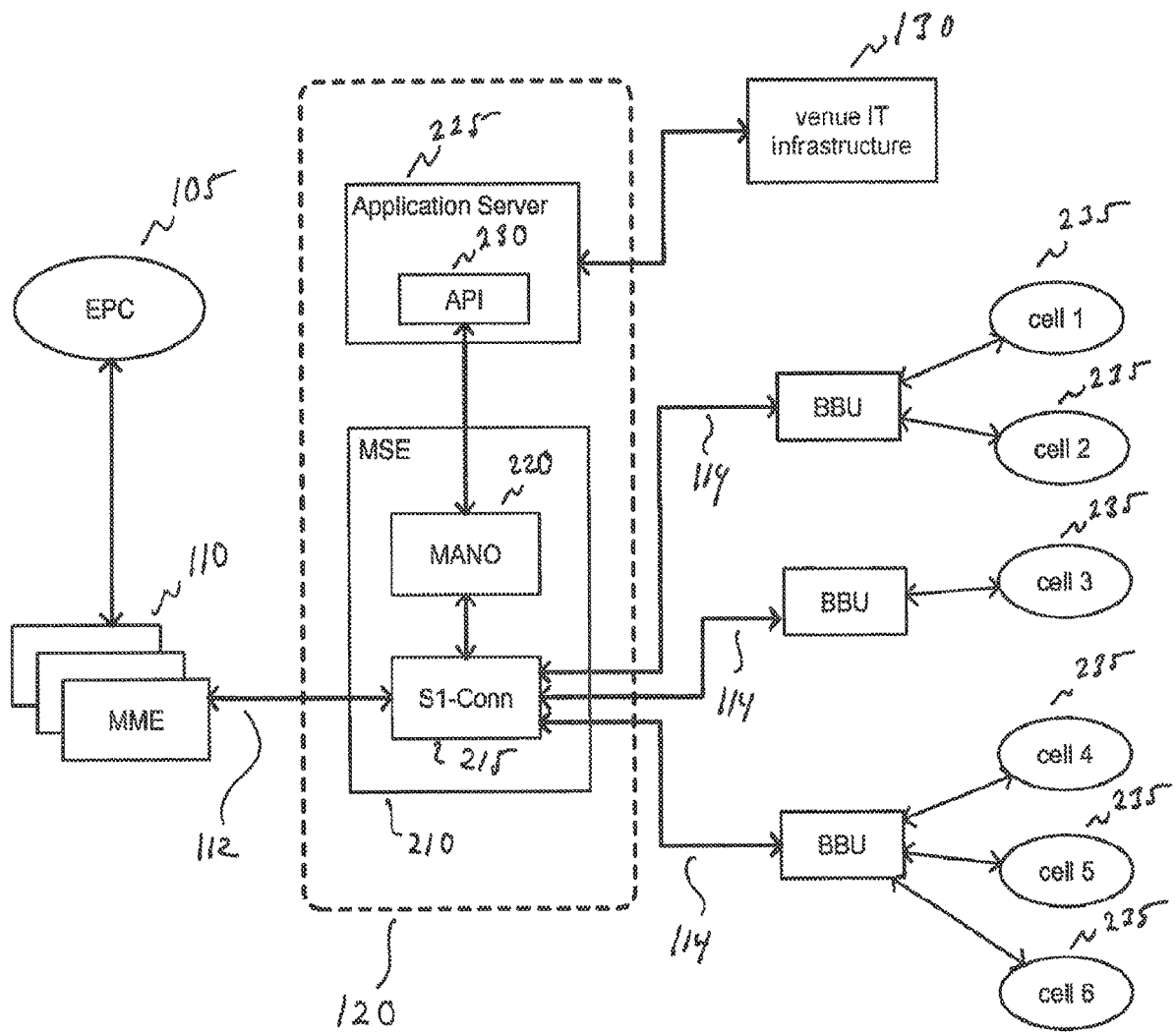
FIG. 2 illustrates an Edge Warning System as it may be integrated into an exemplary mobile edge computing system.

FIG. 2 illustrates the exemplary LTE network edge 10, including Edge Warning System 120, the local venue IT infrastructure 130, and the plurality of baseband processors 115, each of which is coupled to one or more cells 235, each of which may include radio remote units and related antennas and/or one or more DAS systems 121 (not shown).

Referring to FIG. 2, local venue IT infrastructure may be of a variety of IT systems dedicated to a specific venue, such as a stadium, airport, shopping mall, university campus, etc. Local venue IT infrastructure may include IT systems and protocols for its security office, business office, data center, etc. Each of these may be standalone IT systems or may be different functions within one or more aggregated IT systems.

Edge Warning System 120 includes a Mobility Services Engine (MSE) subsystem 210, which includes an S1-Conn component 215 and a Management and Network Operations (MANO) component 220. Edge Warning System 120 further includes an Application Server subsystem 225, which has an Application Program Interface (API) 230. Each of these subsystems and components may be implemented in software that runs on one or more processors (not shown) that are coupled to one or more non-volatile memory components that are encoded with instructions for implementing the functions of each of these subsystems and components. Alternatively, each of these components may be implemented in dedicated processors, or in dedicated special-purpose hardware. Edge Warning System 120 may be located within an eNodeB within or in proximity of the venue, or it may be co-located with the local venue IT infrastructure. Further, the processors in the Edge Warning System 120 may be distributed over multiple sites, including among one or more eNodeBs and/or the local venue IT infrastructure.

Mobility Services Engine (MSE) 210 has (or hosts) components S1-Conn 215 and Management and Network Operations (MANO) component 220. S1-Conn 215 and MANO 220 may be implemented in software using different languages to accommodate for their different requirements and the manner in which they operate. For example, S2-Conn 215 may be implemented in C or C++ due to its need to perform realtime operations on S I-mme signals to and from interfaces 112 and 114, and MANO may not have such stringent realtime requirements but must offer greater flexibility and thus may be implemented in a platform such as JAVA. Both components may be stored as machine readable instructions in a non-volatile memory coupled to one or more processors within the domain of the MSE 210.

S1-Conn 215 performs functions of a realtime S1-mme aggregator and access component. First, it aggregates uplink S1-mme data coming from each of the plurality of S1-mme interfaces 114 into a single uplink aggregated S1-mme interface 112. Second, it terminates the downlink aggregated S1-mme interface 112 and splits the downlink S1-mme data into the plurality of S1-mme interfaces 114 with appropriate S1-mme data being routed to the appropriate BBU 115. The specifics of these functions are described in more detail below. Third, it monitors S1-mme traffic on the aggregated S1-mme interface 112 to identify and log Public Warning System (PWS) related traffic from MMEs 110. Fourth, it monitors and sometimes intercepts PWS-related traffic from the BBUs 115 on the S1-mme interfaces 114. Fifth, it formats and generates locally-specific warning messages (received from MANO 220) and transmits the messages to the appropriate one or more BBUs 115 via respective S1-mme interfaces 114.

MANO 220 performs the maintenance and network operations of Edge Warning System 120. First, it receives PWS messages that were copied or intercepted from the S1-mine interfaces 112 and 114 by S1-Conn 215 and logs the pertinent data contained in those messages. Second, it receives warning message transmission requests from local venue IT infrastructure via API 230 and converts the message information into data that S1-Conn 215 can use to direct the message to the one or more appropriate cells 215. Both of these functions are described further below.

Application Server 225 hosts an application program interface (API) 230 that gives any applications running in the local venue IT infrastructure access to the functions of MSE 210, and it provides a conduit for signaling and data from MSE 210 to the applications running in the venue IT infrastructure 130.

Edge Warning System 120 performs three basic functions: it receives and logs PWS Restart Indication signals from each of its BBUs via interface 114; it receives, logs, and routes unimpeded the PWS messages from MME 110 to each cell 235 via its corresponding BBU 115; and it generates locally-specific PWS messages and transmits these messages to the appropriate cell 235 via its corresponding BBU 115. Each of these functions are further described below.

Figure 3A:
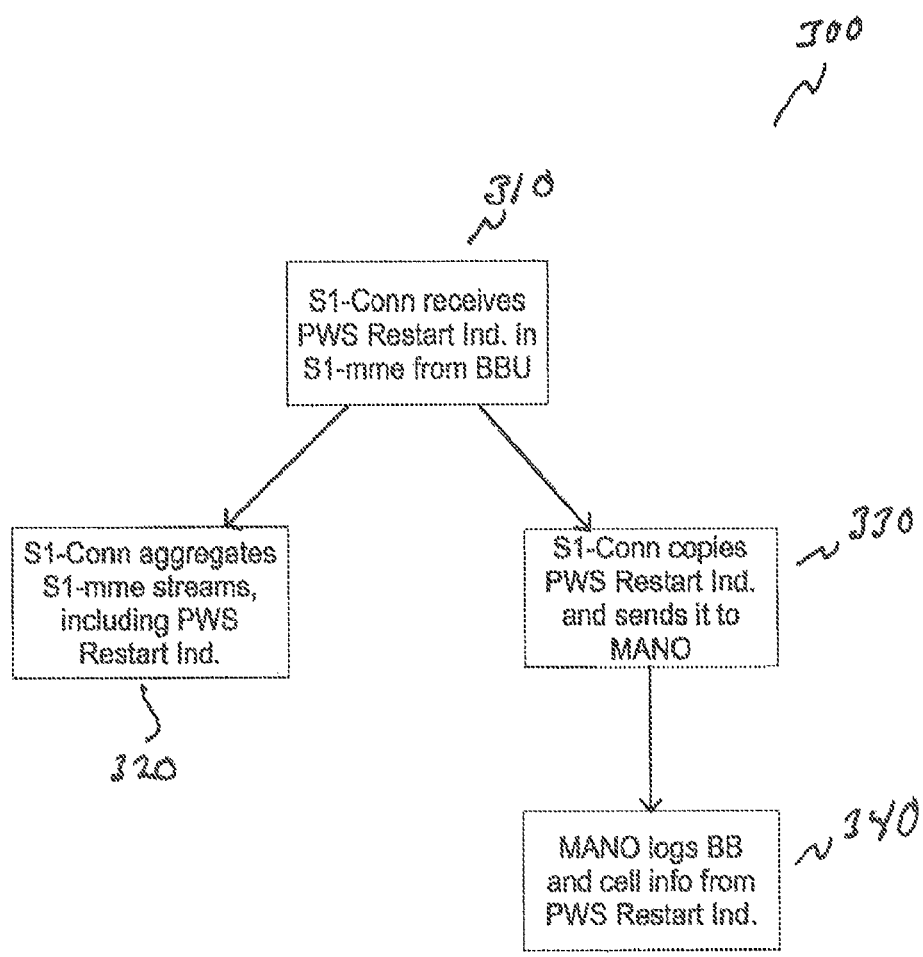
FIG. 3a illustrates an exemplary process for gathering and storing PWS Restart Indication information from each Baseband Unit according to the disclosure.
Figure 3B:
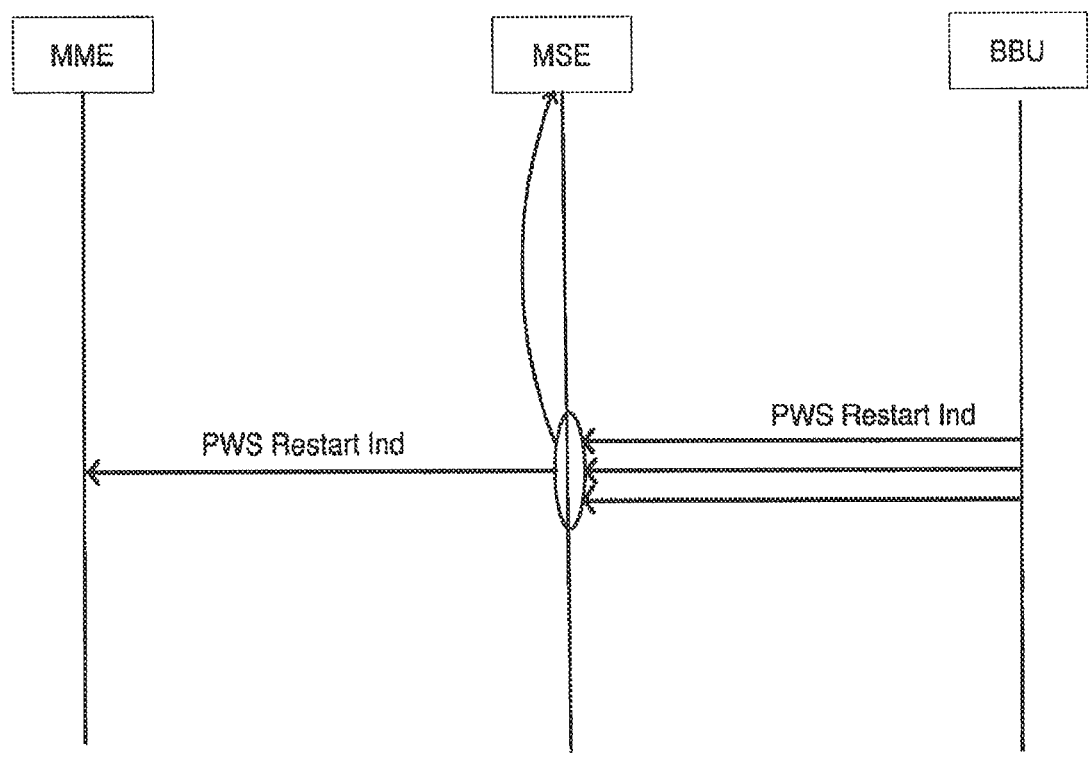
FIG. 3b illustrates an exemplary signal flow and timing diagram for gathering and storing PWS Restart Indication information from each Baseband Unit.

FIGS. 3a and 3b illustrate a process 300 and signal flow and timing diagram for receiving and logging data from each BBU on restart.

In step 310, one or more BBUs 115 restart and transmit a signal indicating that a cell has restarted. An example of a cell restart indication signal is a PWS Restart Indication message that BBU 115 sends to MME 110 via S1-mme interface 114. S1-Conn 215 executes instructions to detect each PWS Restart Indication in each S21-mme interface 114. In step 330, S1-Conn 215 copies the data from each received PWS Restart Indication and sends this data to MANO 220. In doing so, S1-Conn 215 may retrieve the following information: the cell ID, the emergency area ID, and the tracking area ID, along with a time stamp. In step 340, MANO 220 receives the data from S1-Conn 215 and stores it in memory, which may be non-volatile memory. In doing so, MANO 220 maintains a list of all the active cells 235 that are ready to accept warning messages, along with their corresponding cell IDs, etc.

In step 320, S1-Conn 215 executes instructions to aggregate each of the S1-mme streams received from each BBU 115 via corresponding interface 114, including the copied PWS Restart Indication, and transmit the aggregated S1-mme stream to MME 110 over aggregated S1-mme interface 112. In doing so, S1-Conn 215 includes the PWS Restart Indication it received in step 310 and transmits it unimpeded, thereby aggregating and relaying the S1-mme data such that the presence of S1-Conn 215 is undetected and transparent to the communication between each BBU 115 and MME 110.

FIG. 3b illustrates a signal flow and timing diagram for the operation of process 300. Note that although the diagram depicts multiple PWS Restart Indication instances from multiple BBUs 115 via multiple interfaces 114, any given iteration of process 300 may be for a single reception of a PWS Restart Indication from a single cell 235. It will be understood that process 300 may be executed on a single reception, or in a burst mode from multiple simultaneous receptions of PWS Restart Indications, as long as reception, copying of the data, and aggregation of the S1-mme interfaces 114 are performed in real time such that the communication between the BBUs 115 and the MME 110 remains unimpeded and the S1-Conn 215 remains transparent.

Figure 4A:
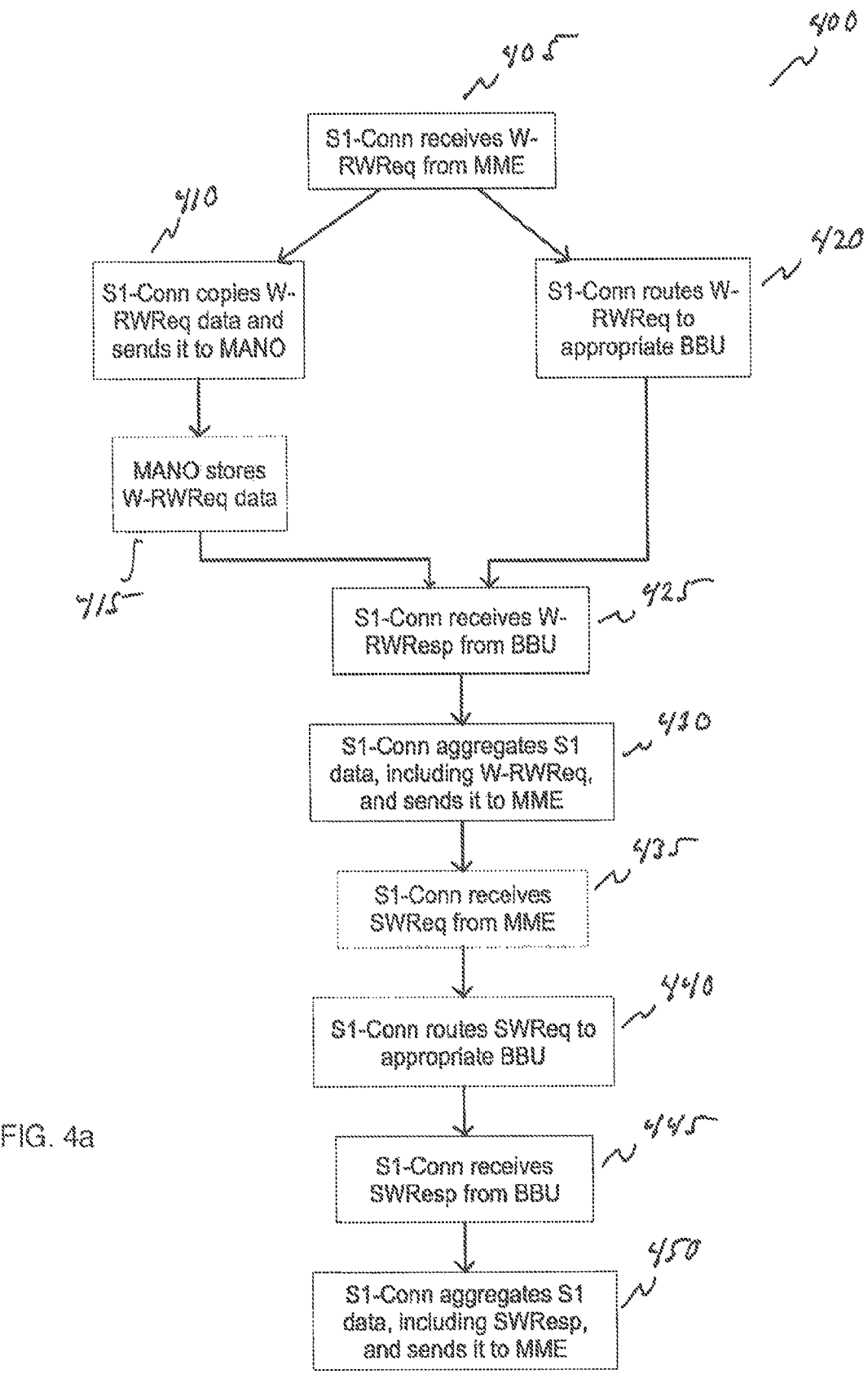
FIG. 4a illustrates an exemplary process for routing PWS messages from the MME to the appropriate Baseband Unit, gathering and storing MME-originated PWS message information, and aggregating PWS message responses from each Baseband Unit according to the disclosure.
Figure 4B:
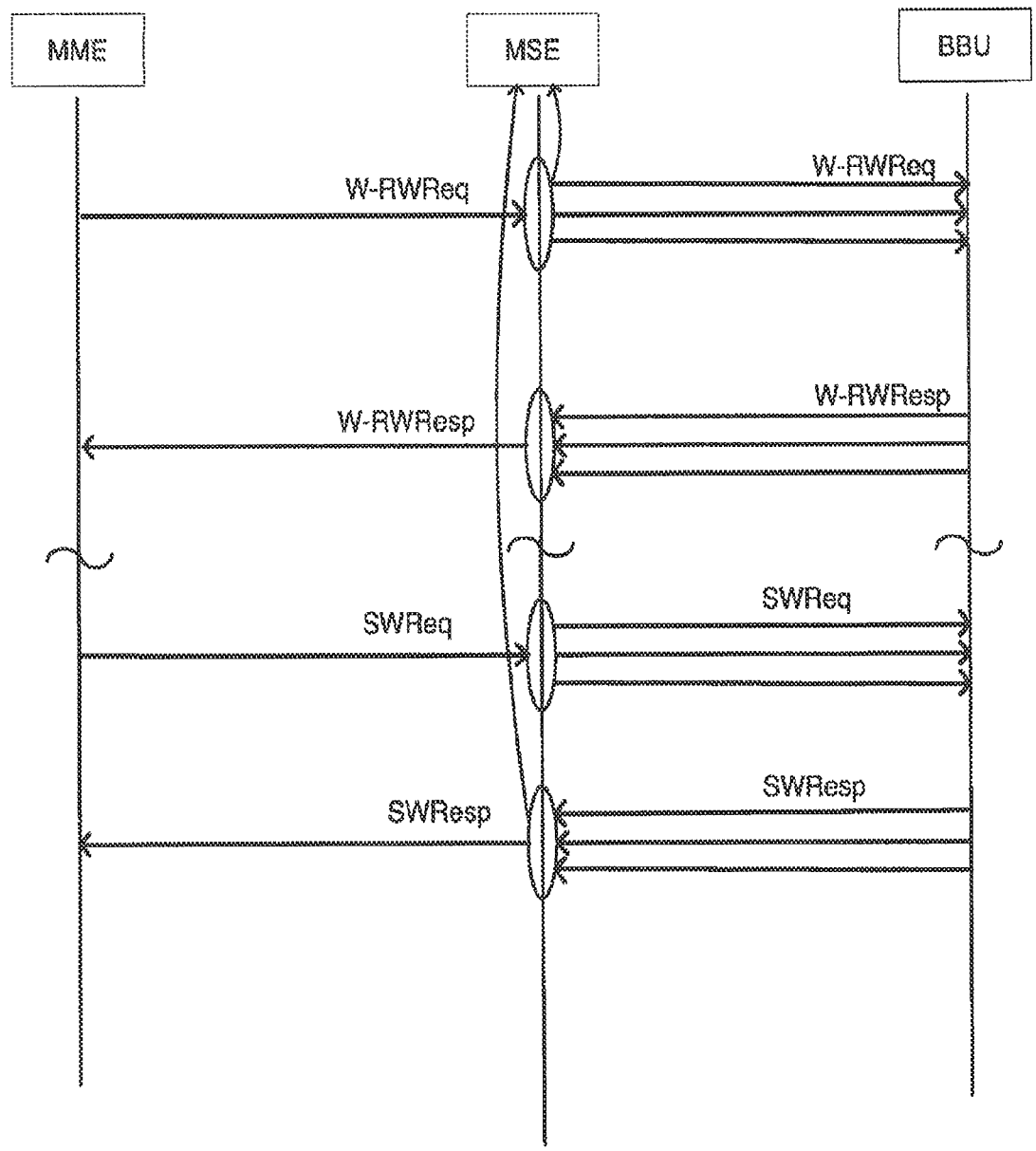
FIG. 4b illustrates an exemplary signal flow and timing diagram for routing PWS messages from the MME to the appropriate Baseband Unit, gathering and storing MME-originated PWS message information, and aggregating PWS message responses from each Baseband Unit.

FIGS. 4a and 4b respectively illustrate a process 40 and a signal flow and timing diagram for routing PWS messages from the MME 110 to the appropriate BBU 115, gathering and storing MME-originated PWS message information, and aggregating PWS message information from each BBU 115 for transmission to the MME 110 over aggregated S1-mme interface 112.

In step 405 S21-Conn 215 executes instructions to monitor aggregated S1-mme interface 112 for detecting a Write-Replace Warning Request (W-RWReq) being sent from MME 110. Once S1-Conn 215 detects a W-RWReq it proceeds to steps 410 and 420. In step 410 S1-Conn 215 copies the relevant data from the message and sends it to MANO 220. The W-RWReq data copied by S1-Conn 215 may include the Message Identifier and Serial Number, and optionally the tracking area ID, cell ID (if present) and a time stamp.

In step 415, MANO 220 may store some or all of this data in non-volatile memory. The purpose for doing this is that, by logging the Message Identifiers and Serial Numbers for identified Write-Replace Warning Requests is that it enables MSE 210 (particularly MANO 220) to generate warning messages that will not conflict with warning messages from MME 110 via conflicting or duplicate data.

In step 420, S1-Conn 215 executes instructions to route the received W-RWReq to the appropriate BBUs 114. If the W-RWReq contains a cell ID or tracking area ID, then S1-Conn 215 may query MANO 220 for the identity of the BBU 115 that corresponds to either the tracking area ID or the cell ID (this information would have been logged by MANO in step 340), and then route the W-RWReq to the appropriate BBU 115 via corresponding S1-mme interface 114. Optionally, S1-Conn 215 may have this information stored locally and need not query MANO 220. Alternatively, S1-Conn 215 may simply broadcast the W-RWReq to all of the BBUs 115. Note that S1-Conn 215 may perform steps 410 and 420 concurrently, or as close to simultaneously as possible, to preserve the transparency of S1-Conn 215 in the communication link between MME 110 and each BBU 115.

Once each BBU 115 has received its respective Write-Replace Warning Request, it generates and send back a Write-Replace Warning Response (W-RWResp) to the MME via its corresponding S1-mme interface 114.

In step 425, S1-Conn 215 detects each W-RWResp sent by each BBU 115 via its respective S1-mme interface 114. Then, in step 430, S1-Conn 215 aggregates each of the S1-mine data streams, including the W-RWResp, from the S1-mme interfaces 114 and transmits it to the MME 110 over aggregated S1-mme interface 112. Optionally, S1-Conn 215 may copy, the response data and send it to MANO 220 for logging.

When the authorized entity responsible for sending the PWS message via MME 110 chooses to do so, it may send a Stop Warning Request (SWReq) to the BBUs 115. When that occurs, S1-Conn 215, which is monitoring S1-mme traffic from aggregated S1-mme interface 112, detects the presence of a SWReq. In step 440, S1-Conn 215 routes the SWReq to the appropriate BBUs 115. In doing so, if the SWReq contains a tracking area ID, S1-Conn may copy the tracking area ID from the message and query MANO 220 for the cell IDs that correspond to the tracking area ID. With these cell IDs, S1-Conn 215 may selectively route the SWReq to the appropriate BBUs 115. Alternatively, S1-Conn 215 may simply broadcast the SWReq to all of the BBUs 115. Regardless of the approach taken, S1-Conn 215 relays the SWReq in real time in order to maintain transparency.

Once each BBU 115 has received its Stop Warning Request, it may take appropriate action and then send a Stop Warning Response (SWResp) to the MME 110 via its corresponding S1-mme interface 114. In step 445, S1-Conn 215, which is monitoring traffic from each S1-mine interface 114, detects the SWResp. S1-Conn 215 may copy the data from each detected SWResp and send the information to MANO 220 so that MANO 220 may log the information indicating that the warning message is finished. This is optional.

In step 450, S1-Conn 215 aggregates each of the S1-mme data streams from the S1-mme interfaces 114, including the SWResp, and transmits it to the MME 110 over aggregated S1-mme interface 112.

FIG. 4b illustrates a signal flow and timing diagram depicting process 400.

Figure 5A:
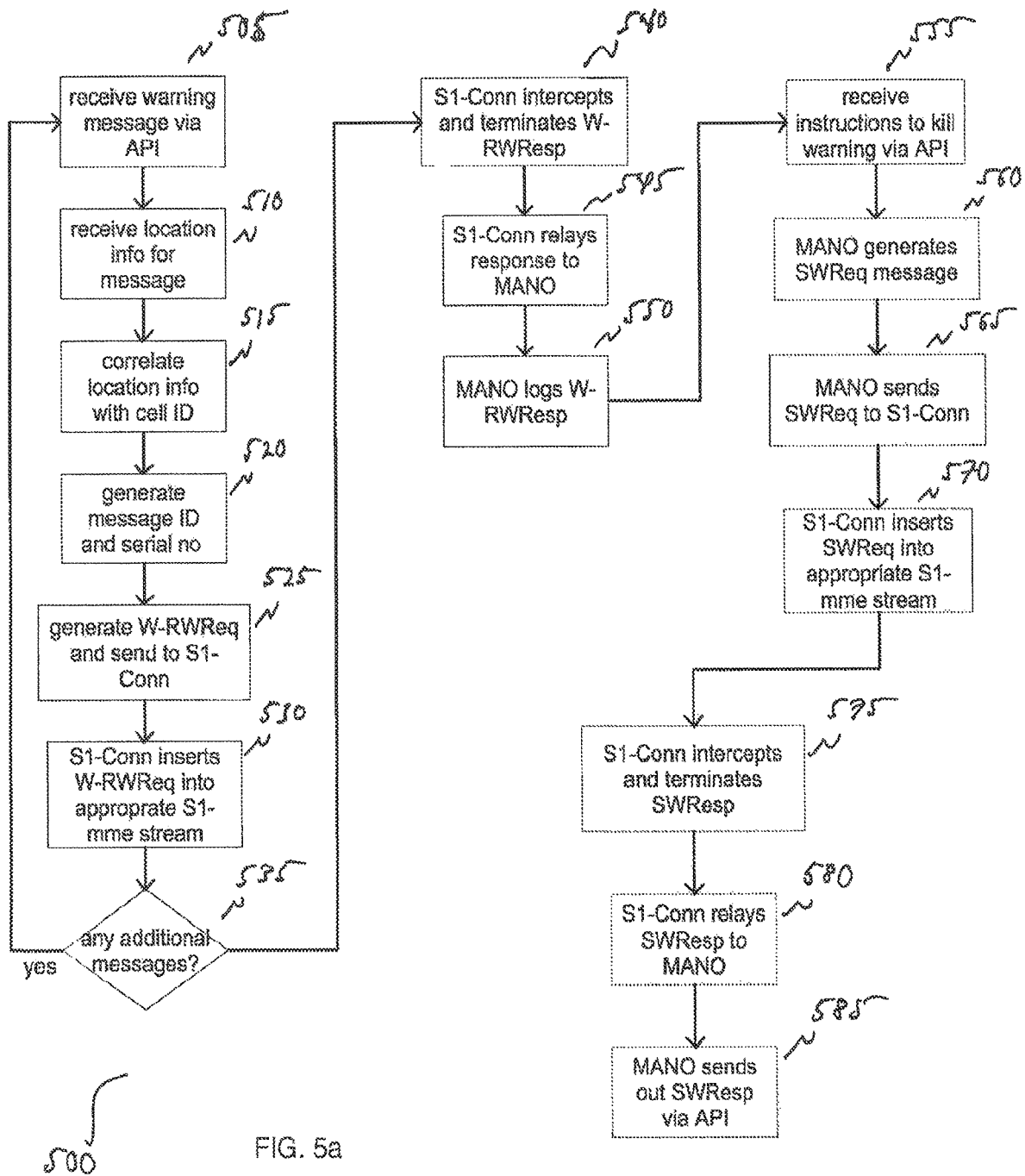
FIG. 5a illustrates an exemplary process for locally generating and providing location-specific warning messages to specific cells according to the disclosure.
Figure 5B:
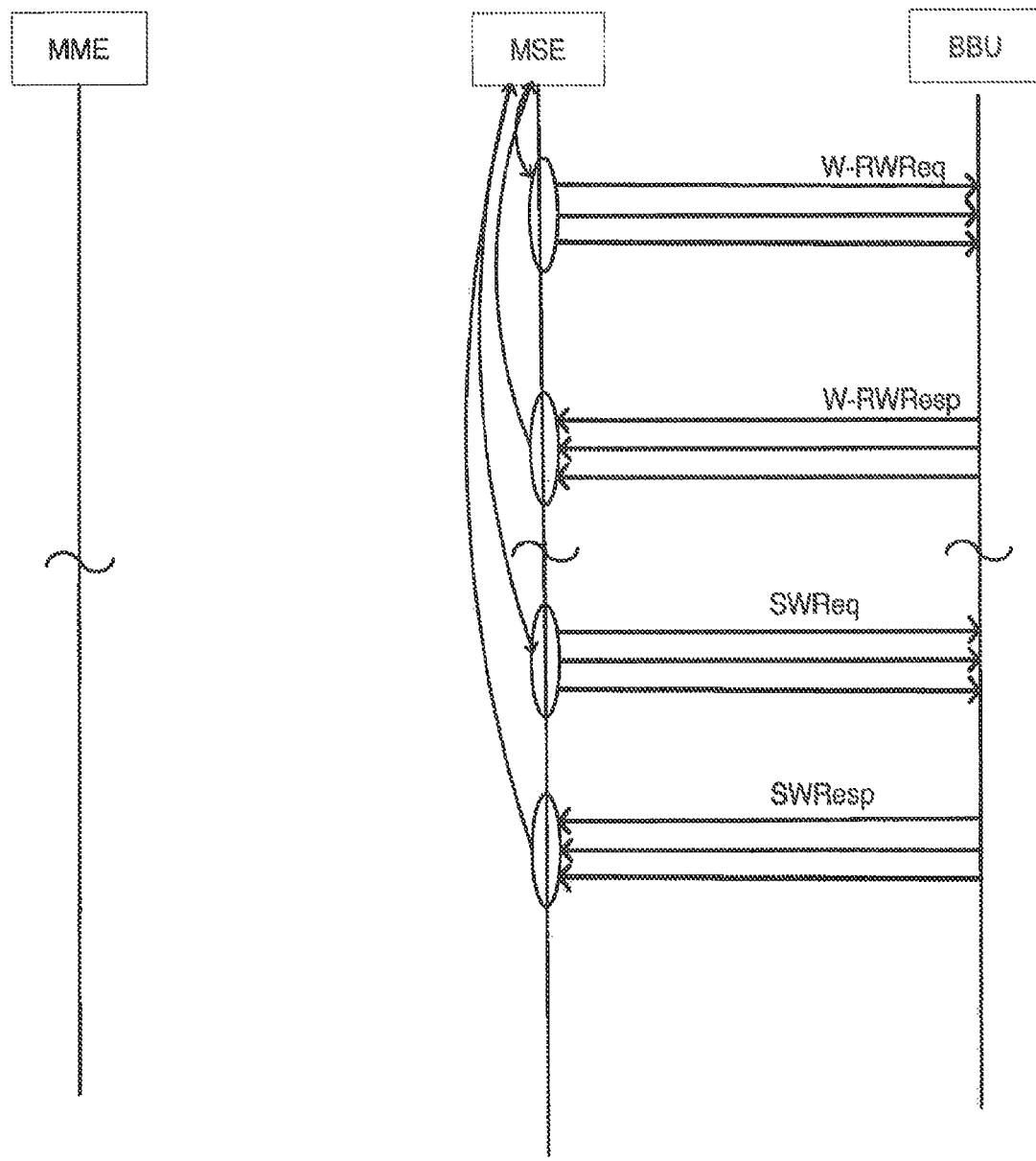
FIG. 5b illustrates an exemplary signal flow and timing diagram for locally generating and providing location-specific warning messages to specific cells.

FIGS. 5a and 5b respectively illustrate a process 500 and a signal flow and timing diagram for locally generating and providing location-specific warning messages to specific cells according to the disclosure. Referring to FIG. 5a, steps 510-535 involve MSE 210 generating a warning message and transmitting it to one or more cells 235: steps 540-550 involve receiving responses from the BBUs 115 corresponding to the appropriate cells 235; steps 555-570 involve MSE 210 sending a stop message request to the appropriate cells 235; and steps 575-585 involve receiving the appropriate stop message response from the BBUs 115 corresponding to the appropriate cells 115.

In steps 505 and 510, MANO 220 executes instructions to receive a warning message request from authorized security personnel via venue IT infrastructure 130 and API 230 within Application Server 225, along with location information, or location identifier, corresponding to the warning message (e.g., all cell devices within a specific university building, all cell devices in a specific section of a stadium, etc.). Each of these locations may be specified by one or more cell IDs, or as one or more "Emergency Zones" that are described later in more detail. The authorized security personnel may provide more than one warning message, each corresponding to a separate location identifier.

In step 515, MANO 220 may execute instructions to correlate the location information with a specific cell ID, if the cell ID was not provided by the security office. In this case, MANO 220 may implement a lookup table or similar technique to derive the desired cell identifier from the location specified. One will appreciate that there are numerous ways for implementing this, each of which is within the scope of the disclosure. Further, MANO 220 may query its appropriate memory for information regarding the readiness of the cell 235 to receive the warning message (i.e., MANO 220 has logged a PWN Restart Indication from the BBU 115 corresponding to the cell 235.

Accordingly, as the venue's cellular network evolves, MANO 220 may serve as the key repository for the mapping of cells to Emergency Zones, so that the security office need only specify which messages go to which Emergency Zones, and MANO 220 would map the Emergency Zones to actual cells. Further, the security office may issue a single warning message to a cluster of Emergency Zones (a subset of the total number of Emergency Zones), and/or may provide a separate distribution of messages for clusters of Emergency Zones. For example, certain contiguous Emergency Zones within a core area may be designated to receive one set of messages, and the remaining Emergency Zones may be designated to receive individual messages, some of which may be shared with the core area and some may be different. Examples might include instructions to proceed to a particular exit that may or may not be obvious to those in that Emergency Zone, instructions to take cover and remain in place, etc.

In steps 520 and 525, the MANO 220 may execute instructions to do the following: to assemble the messages, along with their corresponding cell IDs, that will be sent to each of the BBUs 115 via respective S1-mme interfaces 114; and to send the warning message(s) and corresponding cell identifier(s) to the S1-Conn 215 for transmission to the relevant BBUs 115. Further to step 520, MANO 220 may further assemble the message using a message identifier and a serial number that does not appear among those identified and stored in step 415 of process 400. In doing so, MSE 210 prevents a collision or confusion with existing messages that have been transmitted by MME 110. This may involve MANO 220 querying its non-volatile memory for the message identifiers and serial numbers of previously identified W-RWReqs that were identified in step 405 and stored in step 415, and if there is a match, deriving a different message identifier and/or serial number.

In step 530, S1-Conn 215 executes instructions to format the data for a Write-Replace Warning Request that it then inserts into the appropriate downlink S1-mme interfaces 114 for transmission to the appropriate cell 235 via its corresponding BBU 115.

Steps 505-530 may be executed one for a cluster of messages received by venue IT infrastructure 130, or it may execute these steps iteratively, once per message received. If the latter case is true, in step 535, MANO 220 may query Application Server 225 to determine if there is another warning message, and corresponding location information, is awaiting transmission. If so, process 500 returns to step 505 and repeats through step 530 with the next message. Otherwise, process 500 proceeds to step 540.

Accordingly, at the end of step 535 (or step 530 if all the warning messages to be transmitted were processed in one pass), MSE 210 has sent all of the requested warning messages, provided by the security office via venue IT infrastructure 130, to the appropriate cells 235 via their corresponding BBUs 115 and S1-mme interface 114. At this point in process 500, MSE 210 is waiting for responses from each of the BBUs 115.

In step 540, S1-Conn 215 executes instructions to monitor each S1-mme interface 114 for a Write-Replace Warning Response (W-RWResp) from each cell 235 via its BBU 115. Once it detects a W-RWResp, S1-Conn 215 intercepts and terminates this W-RWResp so that it does not get forwarded to MME 110. This is so that no confusion is created within EPC 105 due to a W-RWResp being received that does not correlate to any W-RWReq sent from the MME 110.

In step 545, S1-Conn 215 forwards all or part of the W-RWResp to MANO 220, indicating that a response was received from the cell ID indicated in the response. Further, in step 550 MANO 220 logs the relevant information indicating that the cell 235 corresponding to the cell ID in the W-RWReq is executing (or has executed) its instructions. Steps 540-550 repeat for each W-RWResp intercepted by S1-Conn 215 until one has been received for each W-RWReq sent by MSE 210. At this point in process 500, MSE 210 waits for instructions from the security office, via venue IT infrastructure 130, to terminate warning message.

In step 555, MANO 220 receives instructions from the security office, via venue IT infrastructure 130 and API 230, to terminate the warning messages. In response, in step 560. MANO 220 generates a Stop Warning Request (SWReq) with a cell ID corresponding to the cell ID or location indicated in the request from the security office. In doing so, if the request from the security office specified an Emergency Zone, MANO 220 may have to correlate the location information or Emergency Zone with a specific cell ID that it will include in the SWReq.

In step 565, MANO 220 relays the generated SWReq data to S1-Conn 215 for transmission to the appropriate cell 215. And in step 570. S2-Conn 215 inserts the message data into the appropriate S1-mine interface 114 for transmission to the designated cell 235 via its corresponding BBU 115. Steps 555-570 repeats for each W-RWReq sent.

In step 575, S1-Conn 210 executes instructions to monitor each S1-mme interface 114 to identify and intercept each Stop Warning Response (SWResp) issued by each cell 250 via its BBU 115. Once S1-Conn 210 identifies a SWResp, it terminates the signal and retrieves the data for relaying to MANO 220 in step 580. Further to step 580, MANO 220 updates the logged PWS message information indicating the warning was terminated by the cell ID indicated in the received SWResp.

In step 585, MANO 220 sends a response to the security office, via Application Server 25 and venue IT infrastructure 130, that the warning message was terminated and that the message is complete for the given cell 235.

It need to be the case that each iteration of steps 555-570 needs to run, covering all of the messages sent, before process 500 may proceed to steps 575-585. Accordingly, at any given time, MSE 210 may be executing instructions to perform any of the steps of sequences 555-570 and 575-585, depending on the timing of the SWResp signals received.

What is claimed is:

1. A mobile edge computing system, comprising:
  a plurality of baseband units, each coupled to a corresponding one of a plurality of S1-mme interfaces;
  an aggregated S1-mme interface configured to be coupled to a Mobility Management Entity;
  an S1-mme aggregator and access component coupled between the plurality of S1-mme interfaces and the aggregated S1-mme interface, the S1-mme aggregator and access component configured to aggregate a plurality of uplink S1-mme signals, one from each of the baseband units, into an aggregated S1-mme signal for transmission over the aggregated S1-mme interface; to terminate a downlink S1-mme signal from the aggregated S1-mme interface and split the downlink S1-mme signal into a plurality of downlink S1-mme signals and route each of the plurality of downlink S1-mme signals to its corresponding one of the plurality of S1-mme interfaces; and to provide access to the S1-mme uplink signals and to the S1-mme downlink signals; and
  a management and network operations component coupled to the S1-mme aggregator and access component, the management and network operations component configured to receive a warning instruction from a venue IT (information technology) infrastructure wherein the warning instruction has a location information, and to generate a Write-Replace Warning Request message for transmission to one or more of the plurality of baseband units.

2. A method for providing a local warning message in an LTE (Long Term Evolution) network, comprising:
  receiving a cell restart indication signal from one of a plurality of S1-mme interfaces, wherein each of the plurality of S1-mme interfaces corresponds to a baseband unit;
  retrieving cell information from the cell restart indication signal;
  storing the cell information; and
  aggregating the plurality of S1-mme interfaces into an aggregated S1-mme interface, including the cell restart indication signal.

3. The method of claim 2, wherein the cell information comprises a cell ID.

4. The method of claim 2, wherein storing the cell information further comprises storing a time stamp corresponding to the receiving of the cell restart indication.

5. The method of claim 2, wherein the cell restart indication signal comprises a PWS (Public Warning System) Restart Indication.

6. A method for providing a local warning message in an LTE (Long Term Evolution) network, comprising:
  receiving a warning instruction from a venue IT (information technology) infrastructure;
  retrieving a location information from the warning instruction;
  generating a Write-Replace Warning Request corresponding to the warning instruction; and
  inserting the Write-Replace Warning Request into a destination S1-mme data stream corresponding to a destination cell, wherein the destination cell is one of a plurality of cells and wherein the destination S1-mme data stream is one of a plurality of S1-mme data streams, each S1-mme data stream corresponding to at least one of the plurality of cells.

7. The method of claim 6, wherein generating the Write-Replace Warning Request comprises:
  retrieving a location identifier from the warning instruction;
  correlating the location identifier with a cell ID; and
  inserting the cell ID into the Write-Replace Warning Request.

8. The method of claim 6, wherein generating the Write-Replace Warning Request comprises:
  querying a memory storing pre-identified Write-Replace Warning Request data for a preexisting message identifier and a preexisting serial number, and
  generating a new message identifier and a new matching serial number that are not equal to the preexisting message identifier and the preexisting serial number.

9. The method of claim 6, further comprising:
  identifying a Write-Replace Warning Response within a designated uplink S1-mme data stream, the designated uplink S1-mme data stream corresponding to the destination cell, the Write-Replace Warning Response corresponding to the Write-Replace Warning Request;
  terminating the Write-Replace Warning Response; and
  storing information corresponding to the Write-Replace Warning Response.

10. The method of claim 9, wherein terminating the Write-Replace Warning Response comprises:
  removing the Write-Replace Warning Response from the designated uplink S1-mme data stream; and aggregating a plurality of uplink S1-mme data streams, including the designated uplink S1-mme data stream into an aggregated S1-mme data stream.

11. The method of claim 9, further comprising:
receiving a stop warning instruction from the venue IT infrastructure;
generating a Stop Warning Request corresponding to the stop warning instruction; and
inserting the Stop Warning Request into the destination S1-mme data stream.

12. The method of claim 11, further comprising:
identifying a Stop Warning Response within the designated uplink S1-mme data stream:
terminating the Stop Warning Response; and
storing information corresponding to the Stop Warning Response.

13. The method of claim 12, further comprising sending an acknowledge signal to the venue IT infrastructure indicating receipt of the Stop Warning Response.

* * * * *